United States Patent [19]

Rooker

[11] Patent Number: 4,486,203
[45] Date of Patent: Dec. 4, 1984

[54] INLET MOMENTUM ABSORBER FOR FLUID SEPARATION

[75] Inventor: Mitchel L. Rooker, Sand Springs, Okla.

[73] Assignee: Combustion Engineering, Inc., Windsor, Conn.

[21] Appl. No.: 485,526

[22] Filed: Apr. 15, 1983

[51] Int. Cl.³ ............................................. B01D 19/00
[52] U.S. Cl. ........................................ 55/174; 55/176; 55/201
[58] Field of Search ................... 55/169, 171–174, 55/176, 185; 210/519

[56] References Cited

U.S. PATENT DOCUMENTS

| | | | |
|---|---|---|---|
| 2,049,068 | 7/1936 | Loupe | 55/174 X |
| 2,508,528 | 5/1950 | McPherson | 55/185 X |
| 2,656,896 | 10/1953 | Glasgow | 55/176 X |
| 2,657,760 | 11/1953 | Glasgow | 55/185 X |
| 2,664,963 | 1/1954 | Lovelady et al. | 55/176 X |
| 2,882,995 | 4/1959 | Smith | 55/185 X |
| 3,009,536 | 11/1961 | Glasgow | 55/174 X |
| 3,009,538 | 11/1961 | O'Dell | 55/174 X |
| 3,727,382 | 4/1973 | Jackson | 55/174 X |
| 4,097,253 | 6/1978 | Phillips et al. | 55/169 |
| 4,422,931 | 12/1983 | Wolde-Michael | 210/519 X |

FOREIGN PATENT DOCUMENTS 2917389 11/1979 Fed. Rep. of Germany ........ 55/185

Primary Examiner—Robert Spitzer
Attorney, Agent, or Firm—Arthur L. Wade

[57] ABSTRACT

Shells of fluid separators are represented by an elongated horizontally extended separator. A high velocity mixture stream is received in the front end of the separator shell upon a partition as part of a structure to absorb the momentum of the stream. A passage is connected to a compartment formed between the partition and vessel wall, with diverter structure mounted on the sides of the passage as additional momentum absorber structure which functions in separating the fluids of the mixture.

5 Claims, 10 Drawing Figures

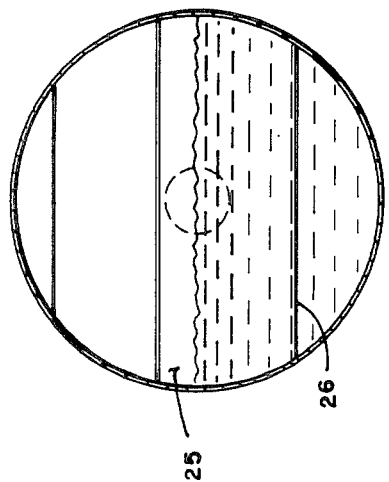
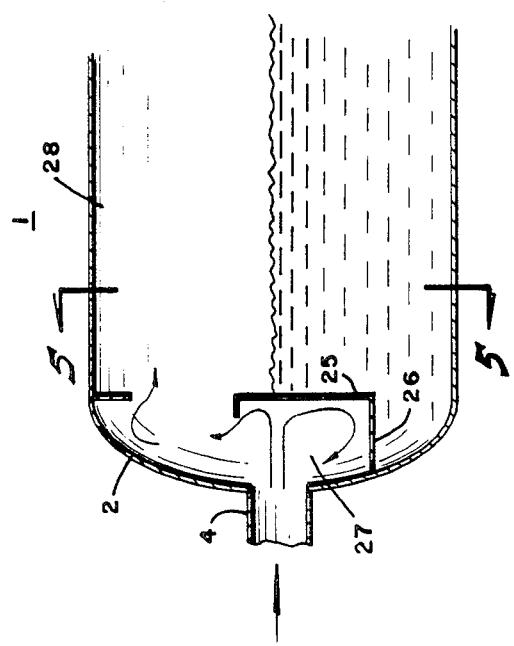

INLET MOMENTUM ABSORBER FOR FLUID SEPARATION

TECHNICAL FIELD

The present invention relates to separators for a mixture of fluids, with internal impact structure upon which a flow stream of the mixture impinges to initiate separation. More particularly, the invention relates to internal impact structure mounted within horizontal separator shells which initiate absorption of the momentum of the mixture which is thereafter distributed evenly over the cross section of a passage along which separation takes place.

BACKGROUND ART

1. Terms and Technology

Gas and/or oil wells produce various ratios of fluid mixtures. These wells represent any source of a fluid mixture processed by the present invention. Only for the purpose of disclosing the preferred embodiment of the present invention, it will be the assumption that a gas-oil ratio (GOR) of at least 5000 scf/barrel will be processed by application of the invention.

The separator refers to a vessel having an input for the mixture to be separated and an output for each of the components of the mixture after they are separated from each other. Although not limited to such, the vessel of the separator with which the invention is disclosed is a steel cylinder oriented to have its axis horizontally extended. Each end of the cylinder is closed by a dished head which may be specifically elliptical or hemispherical; however, normally the elliptical shape is preferred. An entrance conduit is formed through the front head. The outlet conduits may or may not be formed in the second head. In all events, the structure embodying the present invention is mounted internally, most conveniently within the dished front head. Dimensionally, the radius of these shells may range upwardly from 12", with lengths upward from 5 feet, and a wall thickness commensurate with the pressure anticipated from a particular well production.

The embodiment of the invention is noncentrifugal. There is a genre of separators having internals which generate centrifugal forces on the mixtures processed. This class of input structure is to be distinguished from the input structure in which the present invention is embodied. Specifically, the present embodiment of the invention may fall under that class of structure which can be termed "impact" structure, and which dissipates the momentum of the flowing energy of the mixture as a stream.

2. The Operational Environment

The flowing fluid mixture enters its separator at the pipeline velocities having a kinetic energy related K-factor of typically 10. The well-known K-factor equation is:

$$V = K\left(\frac{Pl - Pg}{Pg}\right)^{\frac{1}{2}}.$$

The typical or conventional separator processing a mixture of liquid and gas, has a mist extractor structure in the separating gas flow path which cannot tolerate a K-factor above 0.6. It is the function of the momentum absorber to reduce whatever the pipeline velocity is to the typical superficial K-factor of 0.6. The importance of the function and structure of the momentum absorber has been given little research and development in the face of a serious need for improvement.

In liquid/gas separators, probably the most familiar impact momentum absorber is the rat trap. Also, in general use is the dished head or channel reflector as a target for the incoming stream. These targets are often used with a lower horizontal plate "table". The table prevents high velocity downward streams of gas from picking up previously separated surface liquid below the target. These momentum absorbers produce localized streams with velocities as high as 5 times the design superficial velocity. The result is called maldistribution, non-uniformity of the flow profile, or channeling in the gas flow path. This maldistribution picks up surface liquid and loads up the mist extractor in local areas with high flow rates of gas and liquid. The result is liquid carryover from the mist extractor.

It has long been the practice to form an inlet in the dished head of the separator above the centerline of the horizontal shell. The impact momentum absorber structure has been traditionally mounted within the dished head to receive the inlet stream. There was the elementary hope that the gas would be efficiently released above the lower body of collected liquid separated from the gas and gravitate downward to join the previously separated body of liquid. Recently, economic considerations have motivated centering the inlet to reduce the fabrication cost of the separator. This evaluation became the catalyst for systematic investigation of the true effectiveness, or efficiency, of the conventional impact momentum absorber structure.

There is need for an internal impact structure for a fluid mixture separator with greatly reduced restriction to throughput of the flow stream, while ensuring at least two 180° reversals of direction, and sufficient volume for the resultant eddies in the stream of the mixture to dissipate their flow velocity into heat energy. Further, there is need for strategically placed diverters to prevent strong, localized flow velocities in the subsequent flow area downstream of the impact structure.

DISCLOSURE OF THE INVENTION

The present invention contemplates impact structure mounted in a separator to receive the input flow stream of a fluid mixture through the center of the input head, comprising a vertically extended partition plate mounted on the lower sides of the separator and extending to above the level of the inlet to form a compartment between the plate and the front end of the separator.

The invention further contemplates a protuberance along the top edge of the partition which extends back toward the head of the separator and above the level of the inlet.

The invention further contemplates flow-restricting structure extending from the top inner surface of the separator, down a distance sufficient to form a uniform distribution of the fluid mixture through the flow space above the lower body of the separated component of the mixture.

Other objects, advantages and features of this invention will become apparent to one skilled in the art upon consideration of the written specification, appended claims, and attached drawings.

BRIEF DESIGNATION OF THE DRAWINGS

FIG. 4 is a sectioned elevation of a portion of the separator with an internal variation of the impact and compartment forming structure;

FIG. 5 is a section of FIG. 4 along lines 5—5;

FIGS. 8, 9, 10 and 11 are sectioned elevations of the separator disclosing varients of flow-restricting structure from the compartment into the passage.

BEST MODE FOR CARRYING OUT THE INVENTION

Prologue

Figure 3:
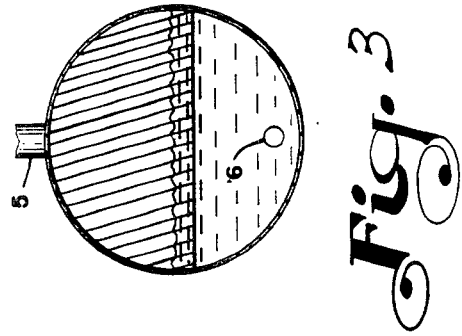
FIG. 3 is a section of FIG. 1 along lines 3—3.

Again, it is to be emphasized that the present invention is embodied in the internal structure within a separator shell which may or may not be cylindrical and horizontally extended. Although the best mode for disclosing the invention utilizes the horizontal separator shell, the invention is not to be limited thereto.

The essential elements of the invention begin with the flat plate which provides a surface mounted at right angles to the flow stream of the mixture of liquid and gas to be separated in the preferred embodiment. The surface of the flat plate causes a first reversal of 180° to the flow stream, back toward the inner surface of the separator wall through which the flow stream is introduced. The direction of the flow stream is reversed 180° a second time by the inner surface of the separator, and numerous eddies of the gaseous component of the flow are thereby created. The eddies are within a compartment having a volume between the surface of the flat plate upon which the flow first impinges, and the inner surface of the separator wall through which the stream is initially introduced. The provision of this volume enables the eddies time to convert their flowing energy into heat, the kinetic energy of the momentum of the stream being thereby absorbed.

In support of the basic function of the flat plate and its compartment formed with the separator head, is a protuberance, lip, shelf, etc. formed on the upper horizontal edge of the plate to project toward the flow stream of the mixture. This structure mounted on the upper edge of the plate is carried at a level above the entry point of the mixture. So positioned, this protuberance gives further insurance that the initial reversal of the flow stream is directed back toward the inlet end of the vessel. The dimension of this protuberance back toward the entrance point of the mixture is a matter of design to leave an adequate flow space between the back edge of the protuberance and the internal wall of the separator head for the reversed flow stream to flow from the compartment into the primary flow passage along the top of the shell.

As the mixture stream flows from the compartment, with its momentum diminishing, and enters the connecting primary passage, additional flow-restricting surfaces are provided as extensions from the upper wall of the separator shell to prevent the channeling of the flow stream necessary to evenly distribute the velocity of the flow stream over the cross section of the primary flow space upstream of a mist extractor.

It is to be emphasized that the invention is effective in separating the components of mixtures made up of other than the liquid and gas mixture of the preferred embodiment. The function of the impact structure embodying the present invention is to absorb the kinetic energy of the momentum in the stream received by the separator. This momentum is reduced by the present invention whether that stream is a mixture of liquid and gas, or two liquids of different densities, or even liquid containing solid particles which require separation from the liquid. Once the momentum of the flowing stream is reduced and the stream flows along the primary passage provided in the vessel, the heavier component, be it liquid or solids, will gravitate downward into the compartment provided between the impact structure and the rear wall of the separator. With this breadth understood, the disclosure of the invention will proceed with the preferred embodiment disclosed in the drawings.

Figure 1:
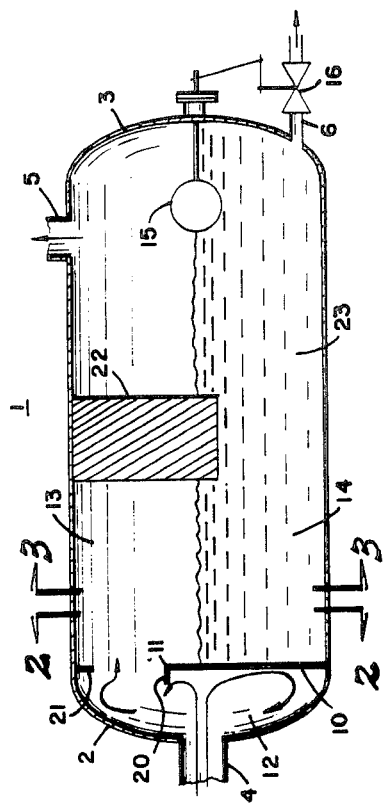
FIG. 1 is a sectioned elevation of a gas-liquid separator having inlet structure embodying the present invention.
Figure 2:
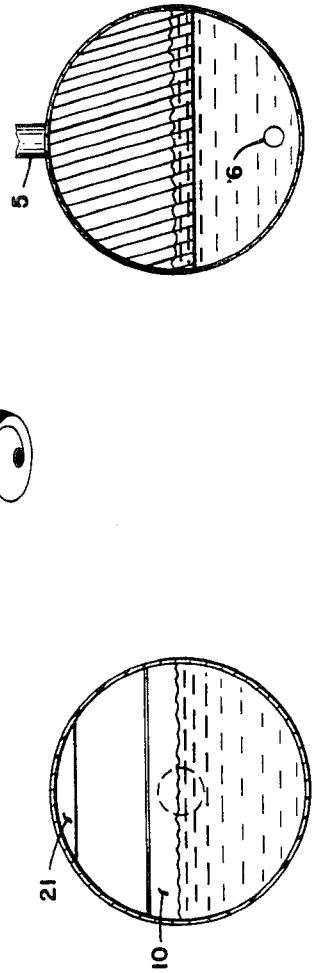
FIG. 2 is a section of FIG. 1 along lines 2—2.
Figure 7:
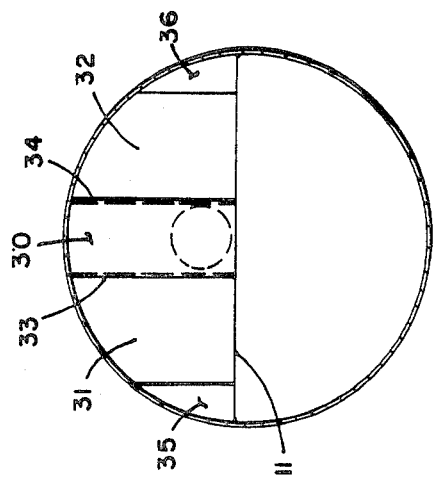
FIG. 7 is a section of FIG. 6 along lines 7—7.
Figure 6:
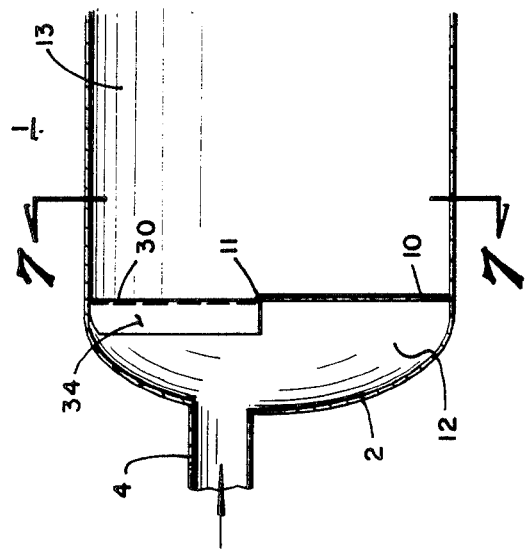
FIG. 6 is a sectioned elevation of the separator of FIG. 1 with a variation of the lip structure on the impact plate.

FIGS. 1, 2 and 3

These drawings figures are to be first analyzed as disclosing the broadest scope of the invention. The shell 1 is shown in the form of a horizontal cylinder with a first dished end closure 2 and a second dished end closure 3. These end closures are ofttimes referred to as the heads of the vessel. An inlet conduit for the mixture to be separated is disclosed at 4, an outlet conduit for the separated gas or vapor is disclosed at 5, and an outlet conduit is disclosed at 6 for the separated liquid. Although not necessary to the broadest concepts of the invention, the mixture inlet 4 penetrates head 2 at the vessel axis. It has been found economical to locate inlet 4 at the center, rather than higher up on the head.

As the mixture is conducted into shell 1 through inlet 4, it impinges upon the facing surface of vertical plate 10. Plate 10 is fixed to the sides of the shell, preferably by being welded into position. The plate extends vertically upward to form a horizontal upper edge 11. The elevation of edge 11 is above the level of inlet 4 so that substantially all of the mixture impacts directly upon the face of plate 10. Understandably, the mixture of gas and liquid rebounds, reversing direction 180° back toward the inner surface of head 2. Upon encounter with the inner surface of head 2, the mixture again rebounds, changing direction a second 180°.

Below the level of the entering mixture stream and its impact point upon the surface of plate 10, a first compartment 12 is formed between the facing surface of plate 10 and the inner surface of head 2. The mixture, having rebounded twice, creates eddies within compartment 12. The volume of compartment 12 is established to give enough residence time for these eddies to convert their energy into heat. The result is that the mixture flows from the top of compartment 12 into connecting passage 13, descreasing in velocity as the mixture travels from the front end of passage 13 toward exit 5 at the second end of passage 13.

Under the broad concepts of the invention, the dissipation of the velocity of the mixture stream lowers its K-factor satisfactorily before the gas or vapor is withdrawn through outlet 5. With the K-factor rapidly decreasing through travel in passage 13, the entrained liquid separates from the gas and falls to the bottom of shell 1 and forms a body 14 in a second compartment. The liquid is withdrawn from body 14 through outlet conduit 6, the level of the liquid being sensed and controlled. To illustrate the control, a float 15 is disclosed as mechanically linked to operate a valve 16 in outlet conduit 6.

Thus, the structures disclosed in FIGS. 1, 2 and 3 embody the broad concepts of the invention in that they provide both an impact surface and compartment in which the K-factor is finally reduced satisfactorily while separation of the gas and liquid takes place. Adjunct to these basic structural arrangements is a protuberance, or lip, 20 on the plate edge 11. This shelf or protuberance is extended back toward the inner surface of head 2 to enhance the efficiency of the surface of plate 10 in reversing the flow of the mixture for the first time and confining the creation of eddies to the first compartment 12. Further, as the mixture stream, with velocity greatly reduced, flows from compartment 12 and into the front end of passage 13, additional flow restrictions are broadly represented by plate 21 which is strategically placed to distribute the mixture flow over the cross section of passage 13 in achieving a satisfactory velocity profile early in passage 13. A mist extractor 22 is positioned in passage 13 and the foregoing structural embodiment of the invention delivers the mixture stream to the mist extractor with a K-value which will enable the extractor to deliver gas to outlet 5 satisfactorily stripped of liquid. The liquid has fallen from the mixture in passage 13 to form body 14 in what may be designated as a second compartment 23 formed between the rearward face of plate 10 and the inner surface of head 3.

First Compartment Size Variation

Refocusing attention on the first compartment as embodying the invention, FIGS. 4 and 5 disclose an alternate structure for controlling the size of this compartment. Plate 10 of the preceding drawings simultaneously provided the required impact surface and the compartment with the first head. However, FIGS. 4 and 5 disclose that the compartment may be formed with a vertical plate 25 and a horizontal table plate 26. Table 26 forms the bottom of this compartment 27 and can be placed at the required elevation to establish the size of compartment 27 necessary to dissipate the velocity of the mixture stream. A passage 28 connects to this compartment, exactly as passage 13 connects with compartment 12. The only difference between the preferred embodiment of the preceding figures and that of FIGS. 4 and 5, is that the latter figures disclose at least one alternate way to establish the volume of the essential first compartment to reduce the K-factor of the stream which thereafter flows into the passage and terminates in the discharge of the gas from the vessel.

Lip Variation

Turning now to structure at least partially equivalent to the lip, ledge, or shelf 20 of FIGS. 1, 2 and 3, FIGS. 6 and 7 again disclose separator vessel 1 with its head closure 2 through which the mixture stream is introduced by inlet conduit 4. Impact-compartment-forming plate 10 is mounted to form compartment 12 within the shell of the separator. However, structure alternate to lip 20 is here provided by channel member 30. Channel 30 is mounted atop edge 11 to vertically extend to the upper inner surface of the separator. The width of channel 30 is established to leave openings 31 and 32 on each side to provide access to passage 13 for the mixture stream. With the flanges 33 and 34 of channel 30 projecting back toward the head closure 2 from their web, these channel flanges can possibly be characterized as equivalent in function to lip 20.

Additionally, the elevation of inlet conduit 4 is no longer restricted to the height of edge 11 of plate 10. Now, the first impact surface for the stream is at least partially provided by the web of channel 30. The rebounding, 180° reversal of direction, takes place as in the preferred embodiment of FIGS. 1, 2 and 3, and the channel flanges are adjunct to this impact surface in carrying out this function. The result that follows, i.e. the reduction of the K-factor of the stream, begins in compartment 12 and continues as the stream flows from compartment 12 through openings 31 and 32 into passage 13.

If it is empirically determined that additional flow restrictions can be strategically placed at this connection between the compartment and passage, plates 35 and 36 represent these flow-restricting devices which function to attain the velocity profile in the cross section of passage 13 as quickly as possible down the length of the passage.

Anti-Channeling Structures

In the preferred embodiment of the invention disclosed in FIGS. 1, 2 and 3, the direction of the mixture flow from first compartment 12 into passage 13 generates the strongest velocity along the top, inner surface of the separator shell. This concentration of the velocity in the cross section of the passage has been previously indicated and representative impact structure designated to break up this velocity pattern and equalize the velocity of the stream over the cross section profile. Although the tendency of the velocity of the mixture stream tends to concentrate near the top of passage 13 in the preferred embodiment, variations of the arrangement forming the impact surface and first compartment may somewhat alter the location of the high velocity channel. As a matter of fact, there may be more than one high velocity channel developed. To emphasize awareness of these variations in the channeling and the structure available to obviate the channeling, the structure of FIGS. 8, 9, 10 and 11 are offered as disclosure.

Figure 10:
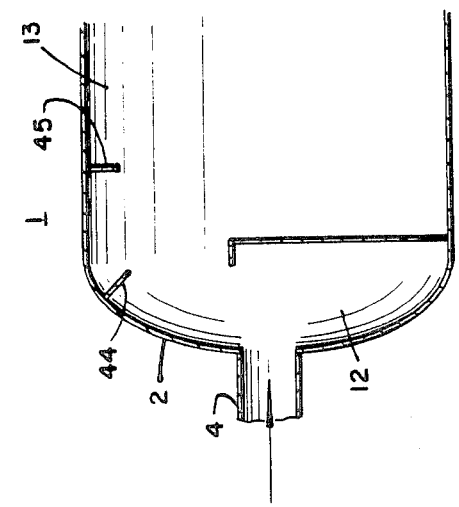

In each of the figures, horizontal separator shell 1 is depicted; first closure head 2 is indicated in FIGS. 10 and 11, along with inlet conduit 4 for the mixture stream. As a further common denominator, passage 13 is depicted in each figure, and if not shown clearly and completely, it is not difficult to infer the location of compartment 12. With the equivalent of plate 10 forming compartment 12, connecting passage 13 can be located. The variations between the figures are in the location and shape of the structures frustrating velocity channeling, or maldistribution, as the mixture flows from compartment 12 into passage 13.

Figure 8:
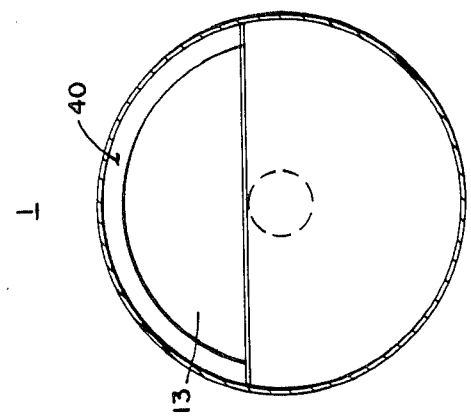

In FIG. 8, flange 40 can be seen as a skirt projecting from the upper internal surface of the separator shell to form an impact surface for the mixture flow. It is expected that this flange will be the size to deflect the flow toward the axis of passage 13 and, thus, evenly distribute the mixture over the cross-sectional area.

Figure 9:
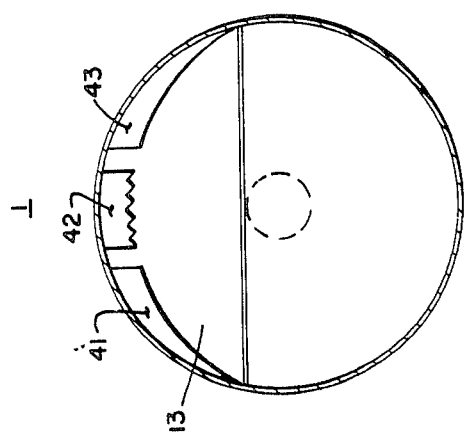

FIG. 9 is similar to the arrangement disclosed in FIG. 8 except that flanges 41, 42 and 43 are separated from each other, tapered as may be found effective, and even serrated as on flange 42.

FIG. 10 is arranged to disclose the fact that protuberances, or flanges, 44 and 45 may be the same size, but may be attached to extend from the inner surface of head 2, or the cylindrical shell of the separator, well into passage 13. In other words, wherever empirical experience dictates, a flow restricting, or obstructing, protuberance, flange, etc. may be mounted to alter the velocity profile of the cross section of passage 13 in order that the mist extractor downstream may be approached with uniformity.

FIG. 11 is within the genre of the preceding three figures in disclosing a flow-controlling structure in plate 46, which is mounted to receive and guide the mixture flowing from compartment 12 so that the flow does not initially reach to the upper inner surface of the separator shell. It is expected that plate 46 will be mounted to the head, just above edge 11 of plate 10 and extend into the connection between compartment 12 and passage 13 so that the flow stream of the mixture will be diverted and obviate the development of the high velocity near the upper internal wall of the shell.

Conclusion

There is some danger of damage to the effectiveness of the disclosure by monotonous repetition. Nevertheless, it is again summarized that the essential elements of the broad concept of the invention are embodied in the arrangement of a plate providing both an impact surface for the stream of the mixture, and a compartment with a wall of the vessel in which the created eddies of the stream may have residence time to convert into heat energy. Thereafter, a passage is provided from the compartment in which the decreasing K-factor of the stream will lower to the value compatible with separation of the fluids of the mixture. The other structures disclosed and defined in the claims are subordinate, or adjunct, to the foregoing essential elements embodying the invention. Taken separately, and together, the structure is novel in view of the prior art.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

I claim:

1. A separator for a mixture of two fluids of different densities, including,
    a horizontally extended cylindrical shell within which the fluids of the mixture are to be separated,
    an inlet formed through a first end of the shell through which to introduce the mixture,
    a substantially vertically extended plate welded to the internal walls of the shell and extends a horizontal upper edge higher than the level of the inlet to form a first compartment with the first end of the shell and provide an impact surface for the mixture through the inlet,
    a passage formed the length of the horizontal cylindrical shell from the first end of the shell and below the horizontal upper edge of the plate to the second end of the shell,
    an outlet structure through the wall of the vessel for the lighter of the fluids from the passage downstream of the first compartment,
    a second compartment within the vessel below the passage within which the heavier of the fluids gravitates from the passage,
    and a conduit connected with the second compartment through the wall of the shell through which the heavier fluid is removed.

2. The separator of claim 1, including,
    a lip mounted on the upper horizontal edge of the plate and extending toward the first end at an elevation above the mixture inlet.

3. The separator of claim 2, including,
    structure extending from the walls of the passage to provide impact surfaces for the mixture flowing in the passage to equalize the velocity profile of the mixture flowing through the cross section of the passage.

4. The separator of claim 1, in which,
    the ends of the cylindrical shell are formed with a dish shape and the inlet for the mixture is formed through the center of the dish of the first end.

5. A separator for a mixture of gas and liquid having a ratio above 5,000 scf/barrel, including,
    an elongated shell of a vessel extended horizontally,
    a conduit through the first end of the vessel shell through which flows a stream of the mixture to be separated within the shell,
    a vertical partition mounted within the shell to extend transverse the axis of the shell in order to receive the impact of the stream and form a first compartment with the first end of the shell,
    a passage formed within the shell connected by its first end to the first compartment and by its second end to an outlet conduit mounted in the second end of the shell,
    a second compartment formed between the vertical partition and the second end of the shell parallel with and below the passage to receive and collect liquid descending from the passage,
    and an outlet conduit through the shell connected to the second compartment through which the separated liquid is removed.

* * * * *